United States Patent [19]

Mentink

[11] Patent Number: 5,749,619
[45] Date of Patent: May 12, 1998

[54] MOTOR VEHICLE WITH FOLDABLE ROOF, AND FOLDABLE ROOF FOR SUCH A MOTOR VEHICLE

[75] Inventor: Laurentius A. G. Mentink, Haaksbergen, Netherlands

[73] Assignee: Applied Power Inc., Butler, Wis.

[21] Appl. No.: 611,584

[22] Filed: Mar. 6, 1996

[30] Foreign Application Priority Data

Mar. 21, 1995 [NL] Netherlands ............... 9500543

[51] Int. Cl.$^6$ ............................................. B60J 7/08
[52] U.S. Cl. .............................. 296/107; 296/117
[58] Field of Search ............................. 296/107, 116, 296/117

[56] References Cited

U.S. PATENT DOCUMENTS

| | | | |
|---|---|---|---|
| 5,026,110 | 6/1991 | Koop et al. | 296/108 |
| 5,042,868 | 8/1991 | Nothaft et al. | 296/107 |

FOREIGN PATENT DOCUMENTS

| | | | |
|---|---|---|---|
| 0 425 156 A2 | 5/1991 | European Pat. Off. | |
| 3726430 | 9/1988 | Germany | 296/107 |
| 39 14638 A1 | 11/1990 | Germany. | |
| 40 04871 A1 | 8/1991 | Germany. | |
| 683613 | 12/1952 | United Kingdom. | |

*Primary Examiner*—Gary C. Hoge
*Attorney, Agent, or Firm*—Quarles & Brady

[57] ABSTRACT

Motor vehicle with a foldable roof, which foldable roof comprises a bow assembly with a main bow, a fabric tensioning bow which can be pivoted up and down, for the rear part of the foldable roof, and a buggy-link system with two links. These links at one side are pivotably connected to each other and are also pivotably connected to the fabric tensioning bow and to a fixing point of the bow assembly respectively.

The foldable roof also comprises a power drive unit which is connected for drive purposes to the buggy-link system, and can move the buggy-link system between an extended position, in which the links thereof lie essentially in line with each other and thereby force the fabric tensioning bow downwards, and a bent position, in which the links lie at an angle relative to each other.

The power drive unit, for example a hydraulic cylinder, is placed in a side wall part of the vehicle. A transmission mechanism is present, which transmission mechanism connects the drive unit for drive purposes to one of the links of the buggy-link system.

16 Claims, 1 Drawing Sheet

MOTOR VEHICLE WITH FOLDABLE ROOF, AND FOLDABLE ROOF FOR SUCH A MOTOR VEHICLE

BACKGROUND OF THE INVENTION

Field of the Invention

The present invention relates to a motor vehicle with a foldable roof.

DISCUSSION OF THE PRIOR ART

A motor vehicle with a foldable roof is known from, for example, DE 39 14 638. In the case of this known foldable roof the essentially U-shaped fabric tensioning bow is pivotably connected at both ends to the main bow, which in turn is pivotably connected to the two side walls of the body of the motor vehicle. The fabric tensioning bow can be pivoted up and down independently of the main bow by means of a power drive unit which is intended specifically for that purpose and acts upon the buggy-link system, and which in this case is a double-acting hydraulic cylinder. The cylinder body of said cylinder is pivotably connected to the fabric tensioning bow, and the piston rod of the cylinder is connected to the top link of the buggy-link system. By sliding in or sliding out this cylinder, the buggy-link system is bent or in fact extended, and the rear part of the foldable roof is thus moved. By means of the cylinder the links of the buggy-link system can be moved through the dead centre, with the result that the fabric tensioning bow is locked in its forced-down position. It is usual for a buggy-link system to be present at each side of the fabric tensioning bow.

In the trade the fabric tensioning bow is usually called "fifth bow". The arrangement of the cylinder shown in DE 39 14 638, which serves for independent operation of the buggy-link system has the major disadvantage that said cylinder is in fact situated in the passenger area and takes up an undesirably large amount of space there. Moreover, supply and discharge hoses for hydraulic fluid are connected to the cylinder, which hoses in this known arrangement of the cylinder inevitably run in a complex manner with many bends. These hoses undergo undesirably large bending movements when the foldable roof is opened and closed.

SUMMARY OF THE INVENTION

The object of the present invention is to eliminate the abovementioned disadvantages.

This object is achieved by providing a motor vehicle wherein the power drive unit is placed in a side wall part of the vehicle, and wherein a transmission mechanism is present, which transmission mechanism connects the drive unit for drive purposes to one of the links of the buggy-link system.

Placing the drive unit specifically intended for operating the buggy-link system in a side compartment of the body of the motor vehicle means that not only are the above disadvantages eliminated, but it is also possible to use a drive unit with relatively large dimensions. For example, it is possible to use an electrically driven linear actuator which will have larger dimensions than a hydraulic cylinder designed for the same purpose.

The transmission mechanism preferably comprises a linkage mechanism. Depending on the available space in the motor vehicle in question, the movement of the drive unit can be transferred in a simple manner to the buggy-link system by means of a linkage mechanism. The parts of the linkage mechanism then preferably lie in the plane of the side wall of the body of the vehicle, so that the space remains free as far as possible for the passengers.

The present invention also relates to a foldable roof for a motor vehicle according to the invention. In the car industry foldable roofs are supplied as a complete system to the car manufacturer and fitted in the body of the car.

BRIEF DESCRIPTION OF THE DRAWINGS

The invention is explained in greater detail below with reference to the appended drawing, in which.

DETAILED DESCRIPTION OF THE PREFERRED EMBODIMENTS

Figure 1:
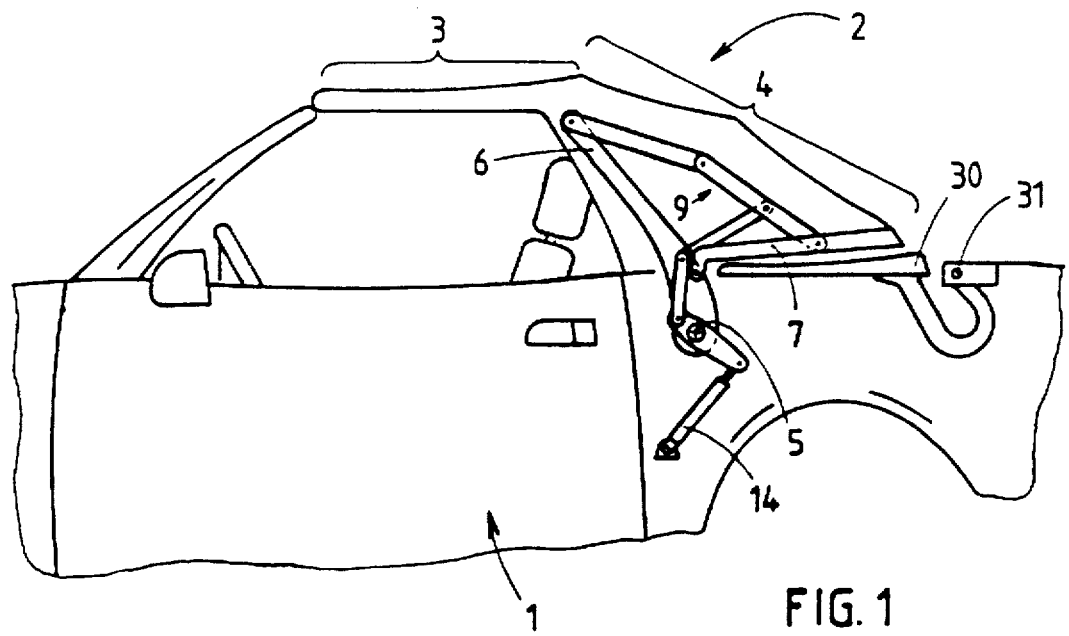
FIG. 1 shows diagrammatically a partial side view of a motor vehicle according to the invention provided with a preferred embodiment of the foldable roof.

The convertible-type car 1, which is only partially shown in FIG. 1, has a motor-driven foldable roof unit 2. The foldable roof unit 2, part of which is shown in detail in FIG. 2, comprises a front roof part 3, a rear roof part 4, and a main bow 6 which is swivellable about a pivot pin 5 situated at right angles to the direction of travel. A fifth bow 7 which is U-shaped in top view is connected to the main bow 6 in such a way that it is swivellable about a pivot pin 8 running essentially parallel to the pin 5. The fifth bow 7 serves to move the rear part 4 of the foldable roof. A buggy-link system 9 is present at each side of the car 1, by means of which system the fifth bow 7 can be moved.

Each buggy-link system 9 comprises two links 9a, 9b. Said links 9a and 9b are connected to each other in such a way that they are swivellable at point 10 about a pin which is essentially parallel to the pins 5 and 8. The link 9a is also pivotably connected at its top end to fixing point 11 of the main bow 6, and the link 9b is pivotably connected at its bottom end, at point 12, to the fifth bow 7.

A motor drive unit 14, in this case a double-acting hydraulic cylinder, is placed in each of the side walls of the car 1, and is connected at one end to the body. The cylinder 14 is connected for drive purposes to the buggy-link system 9, and can move the buggy-link system 9 between an extended position, in which the links 9a and 9b thereof lie essentially in line with each other (FIGS. 1 and 2) and thereby force the fifth bow 7 downwards, and an angled position, in which the links 9a and 9b lie at an angle relative to each other (not shown; the fifth bow 7 then lies adjacent the main bow 6).

The connection for drive purposes between the cylinder 14 and the buggy-link system 9 is formed by a linkage mechanism, an advantageous embodiment of which is shown in the drawing.

The linkage mechanism comprises a lever 16, which is swivellable about a corresponding point of rotation 17, which coincides here with the point of rotation 5 of the main bow 6. At one side of the point of rotation 17 the cylinder 14 acts upon the lever 16, and at the other side of the point of rotation 17, at point 18, the lever 16 is pivotably connected to an intermediate link 19. Said link 19 is in turn pivotably connected, at pivot point 20, to a following link element 21. Said link element 21 is pivotably connected to a point 22 of link 9b of the buggy-link system 9 and extends in the direction of the point of rotation 5 of the main bow 6.

A spacer element 23 is pivotably connected to the point of rotation of the fifth bow 7 and to the pivot point 20 between the intermediate link 19 and the link element 21 which is connected to the buggy-link system 9.

Figure 2:
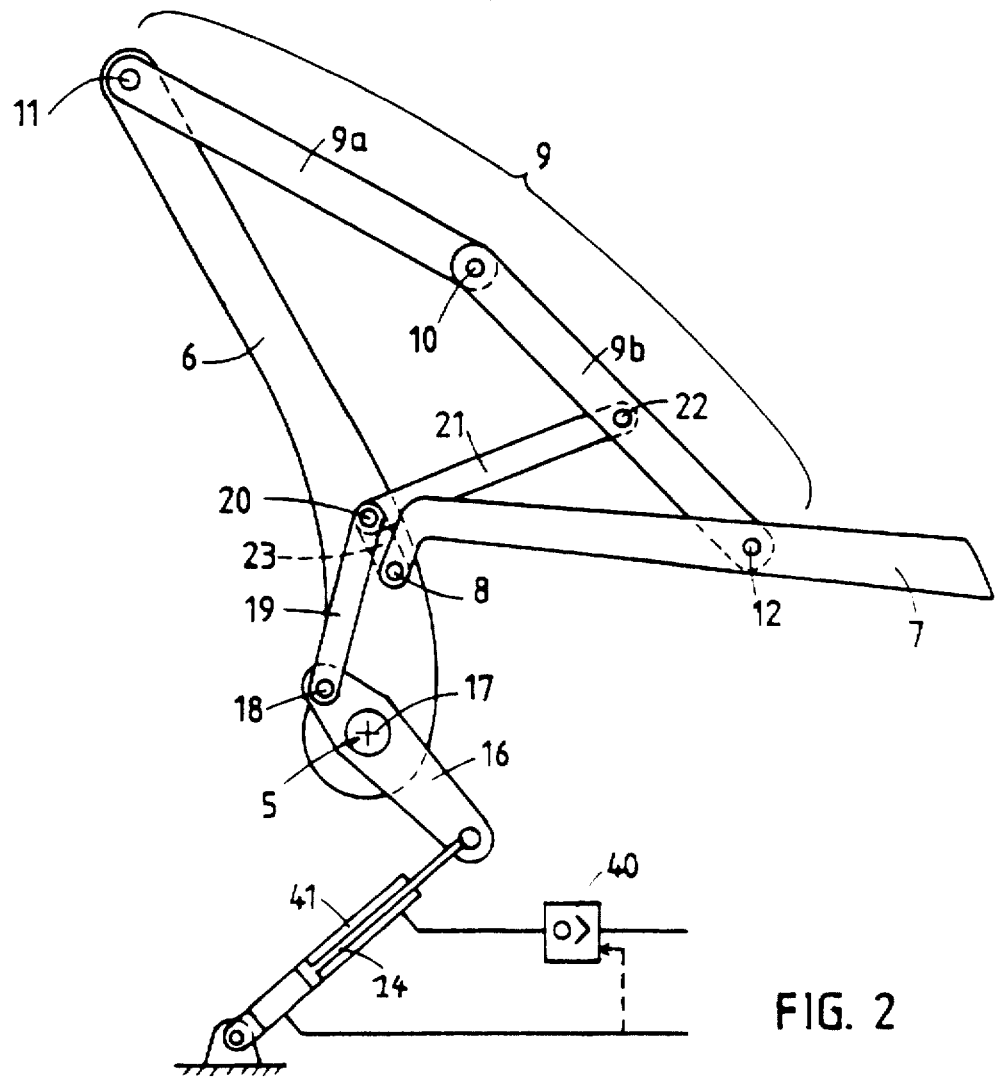
FIG. 2 shows diagrammatically in side view the part of the foldable roof of FIG. 1 relevant for the present invention.

The links 9a and 9b are moved out of their illustrated position into the mutually angled position by extending the piston rod of the cylinder 14 relative to the position shown in FIG. 2. As a result of this, the fifth bow 7 will pivot in the direction of the main bow 6.

In FIG. 2 the links 9a and 9b are situated in a position which can be described as "moved through the dead centre". This position is possible by a suitable choice of transmission mechanism. In this position the fifth bow 7 is locked and cannot be undesirably moved upwards. A very reliable locking of the fifth bow 7 is obtained by accommodating a hydraulically operated non-return valve (40) in the supply line to the working chamber (41) of the cylinder 14, which working chamber (41) moves the buggy-link system 9 into an extended position. It is then impossible to force the links 9a and 9b by hand through the dead centre, in order to be able to lift the rear part 4 of the roof in that case, as might be attempted when someone is trying to break into the car. This means that no mutual locking of the links 9a and 9b is necessary, and an additional lock to be fitted in order to fasten the fifth bow 7 to the body can be dispensed with in this case.

FIG. 1 also shows a cover 30 which serves to cover a compartment in which the foldable roof 2 is situated when the roof is fully open. Such a cover 30 is generally known, and is called a tonneau cover in the trade. Separate drive means are provided for swinging the cover 30 up and down about corresponding axis 31. The movement of the main bow 6 is also achieved by separate drive means, for example a set of hydraulic cylinders.

It will be clear that the link 9a need not necessarily be connected to the main bow 6, but that this connection can also be to another part of the roof which is approximately at that point. It is also possible for the link 9a to extend in a manner known per se past the point of rotation 11 and be connected there to another part of the front roof part 3. It is likewise clear that the link element 21 can also act upon link 9a if desired. Other embodiments of the linkage mechanism are also possible, so that the mechanism can be adapted in the optimum manner in each case to the motor vehicle in question and its foldable roof.

I claim:

1. A motor vehicle with a foldable roof, which foldable roof comprises a bow assembly with a main bow, a fabric tensioning bow for a rear part of the foldable roof which fabric tensioning bow can be pivoted up and down, and a buggy-link system with two links which are pivotably connected to the fabric tensioning bow and to a fixing point of the bow assembly respectively, the foldable roof also comprising a power drive unit which is connected for drive purposes to the buggy-link system and can move the buggy-link system between an extended position, in which the links thereof lie essentially in line with each other and thereby force the fabric tensioning bow downwards, and an angled position, in which the links lie at an angle relative to each other, wherein the power drive unit is placed in a side wall part of the vehicle, and a transmission mechanism is present, which transmission mechanism connects the drive unit for drive purposes to one of the links of the buggy-link system.

2. A motor vehicle according to claim 1, in which the transmission mechanism is a linkage mechanism.

3. A motor vehicle according to claim 2, in which the linkage mechanism comprises a first link element which is pivotably connected to one of the links of the buggy-link system and extends from there in the direction of a point of rotation of the fabric tensioning bow.

4. A motor vehicle according to claim 2, in which the linkage mechanism comprises a lever which is pivotable about a corresponding point of rotation thereof, in which at one side of said point of rotation, the drive unit acts upon the lever, and at the other side of said point of rotation, the lever is pivotably connected to an intermediate link, which in turn is pivotably connected to a following link element, which is pivotably connected to one of the links of the buggy-link system.

5. A motor vehicle according to claim 4, in which a spacer element is pivotably connected to a point of rotation of the fabric tensioning bow and to a pivot point between the intermediate link and the link element which is connected to the buggy-link system.

6. A motor vehicle according to claim 4, in which the point of rotation of the lever coincides with a point of rotation of the main bow.

7. A motor vehicle according to claim 1, in which the drive unit is a double-acting hydraulic cylinder.

8. A motor vehicle according to claim 7, in which a hydraulically operated non-return valve is accommodated in a supply line to a working chamber of the cylinder, which working chamber moves the buggy-link system into an extended position.

9. A foldable roof for a motor vehicle, which foldable roof comprises a bow assembly with a main bow, a fabric tensioning bow for the rear part of the foldable roof which fabric tensioning bow can be pivoted up and down, and a buggy-link system with two links which are pivotably connected to the fabric tensioning bow and to a fixing point of the bow assembly respectively, the foldable roof also comprising a power drive unit which is connected for drive purposes to the buggy-link system and can move the buggy-link system between an extended position, in which the links thereof lie essentially in line with each other and thereby force the fabric tensioning bow downwards, and an angled position, in which the links lie at an angle relative to each other, wherein the power drive unit is positioned relative to said roof for placement in a side wall part of the vehicle, and said roof further includes a transmission mechanism which connects the drive unit for drive purposes to one of the links of the buggy-link system.

10. A foldable roof according to claim 9, in which the transmission mechanism is a linkage mechanism.

11. A foldable roof according to claim 10, in which the linkage mechanism comprises a first link element which is pivotably connected to one of the links of the buggy-link system and extends from there in the direction of a point of rotation of the fabric tensioning bow.

12. A foldable roof according to claim 10, in which the linkage mechanism comprises a lever which is pivotable about a corresponding point of rotation thereof, in which at one side of said point of rotation, the drive unit acts upon the lever, and at the other side of said point of rotation, the lever is pivotably connected to an intermediate link, which in turn is pivotably connected to a following link element, which is pivotably connected to one of the links of the buggy-link system.

13. A foldable roof according to claim 12, in which a spacer element is pivotably connected to a point of rotation of the fabric tensioning bow and to a pivot point between the intermediate link and the link element which is connected to the buggy-link system.

14. A foldable roof according to claim 12, in which the point of rotation of the lever coincides with a point of rotation of the main bow.

15. A foldable roof according to claim 9, in which the drive unit is a double-acting hydraulic cylinder.

16. A foldable roof according to claim 15, in which a hydraulically operated non-return valve is accommodated in a supply line to a working chamber of the cylinder, which working chamber moves the buggy-link system into an extended position.

* * * * *